US008923844B2

(12) United States Patent
van Rensburg et al.

(10) Patent No.: US 8,923,844 B2
(45) Date of Patent: Dec. 30, 2014

(54) COORDINATED BEAM FORMING AND MULTI-USER MIMO

(75) Inventors: Cornelius van Rensburg, Wylie, TX (US); Oghenekome Oteri, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 511 days.

(21) Appl. No.: 12/853,067

(22) Filed: Aug. 9, 2010

(65) Prior Publication Data
US 2011/0039547 A1    Feb. 17, 2011

Related U.S. Application Data

(60) Provisional application No. 61/234,225, filed on Aug. 14, 2009.

(51) Int. Cl.
*H04W 24/00* (2009.01)
*H04W 72/12* (2009.01)

(52) U.S. Cl.
CPC ...... *H04W 72/1226* (2013.01); *H04W 72/1252* (2013.01)
USPC ............ 455/423; 455/24; 455/67.11; 455/69; 455/126; 455/420; 370/329; 370/330; 370/331; 370/332; 375/260; 375/263; 375/265

(58) Field of Classification Search
CPC .................... H04W 72/1205; H04W 72/1252; H04W 72/1284
USPC ......... 455/561–562.1, 68, 69, 70, 126, 127.1, 455/500–510; 370/328, 319, 330, 310, 336, 370/343, 465, 478, 335, 342, 329, 390, 370/395.42; 375/260–263
See application file for complete search history.

(56) References Cited

U.S. PATENT DOCUMENTS

| 5,903,842 A | 5/1999 | Wang et al. |
| 6,917,821 B2 * | 7/2005 | Kadous et al. ............. 455/562.1 |

(Continued)

FOREIGN PATENT DOCUMENTS

| CN | 1992970 A | 7/2007 |
| CN | 101252768 A | 8/2008 |
| CN | 101442808 A | 5/2009 |
| CN | 101478342 A | 7/2009 |

OTHER PUBLICATIONS

Alcatel-Lucent, "UE PMI feedback signalling for user pairing/coordination," 3GPP TSG RANn WG1 #55 Meeting R1-084141, Prague, Czech Republic, Nov. 10-14, 2008, 3 pages.

(Continued)

*Primary Examiner* — Babar Sarwar
(74) *Attorney, Agent, or Firm* — Slater & Matsil, L.L.P.

(57) ABSTRACT

In one embodiment, a method for wireless communication includes receiving cell information for a cluster of cells to be coordinated. A first cluster scheduling order used for the cluster of cells is retrieved. The first cluster scheduling order represents a sequence in which the cluster of cells were scheduled in a previous schedule. A second cluster scheduling order is generated. The second cluster scheduling order determines a sequence in which the cluster of cells are scheduled in an upcoming schedule. The second cluster scheduling order is decided based on the first cluster scheduling order and/or the cell information. The second cluster scheduling order is transmitted to the cluster of cells.

24 Claims, 9 Drawing Sheets

(56) References Cited

U.S. PATENT DOCUMENTS

| | | | |
|---|---|---|---|
| 7,065,144 B2* | 6/2006 | Walton et al. | 375/260 |
| 7,466,749 B2* | 12/2008 | Medvedev et al. | 375/227 |
| 8,040,842 B2* | 10/2011 | Nakatsugawa | 370/329 |
| 8,520,537 B2 | 8/2013 | van Rensburg et al. | |
| 2003/0165123 A1* | 9/2003 | Saunders et al. | 370/329 |
| 2007/0058583 A1* | 3/2007 | Cho et al. | 370/329 |
| 2007/0211823 A1* | 9/2007 | Mazzarese et al. | 375/299 |
| 2008/0043677 A1* | 2/2008 | Kim et al. | 370/332 |
| 2009/0154419 A1* | 6/2009 | Yoshida et al. | 370/330 |
| 2012/0281662 A1* | 11/2012 | Prasad et al. | 370/329 |

OTHER PUBLICATIONS

Chae, C-B., et al., Coordinated Beamforming with Limited Feedback in the Mimo Broadcat Channel, IEEE Journal on Selected Areas in Communications, vol. 26, No. 8, Oct. 2008, pp. 1505-1515.

Chae, C-B., et al., "Network Coordinated Beamforming for Cell-Boundary Users: Linear and Nonlinear Approaches," IEEE Journal of Selected Topics in Signal Processing, vol. 3, No. 6, Dec. 2009, pp. 1094-1105.

Ericsson, et al., "LTE Rel8/10 Performance and IMT-Advanced Requirements," 3 GPP TSG RAN WG1 Meeting #57bis R1-092739, Los Angeles, CA, Jun. 29-Jul. 3, 2009, 11 pages.

Hitachi, Ltd., "Interference management for broadband transmission with antenna port 5," 3GPP TSG RAN WG1 #55bis R1-090068, Ljubljana, Slovenia, Jan. 12-16, 2009, 3 pages.

Huawei, "Some results on DL coordinated beam switching for interference management in LTE-Advanced," 3GPP TSG WG1#55 R1-084352, Prague, Czech Reqpublic, Nov. 10-14, 2008, 7 pages.

Huawei, "Signalling Aspects and TP on DL CoMP for LTE-Advanced," 3GPP TSG RAN WG1 meeting #56 R1- 090818, Athens, Greece, Feb. 9-13, 2009, 3 pages.

Huawei, "CoMP Coordinated Scheduling for LTE-Advanced," 3 GPP TSG RAN WG1 meeting #56bis R1-091263, Seol, Republic of Korea, Mar. 23-27, 2009, 7 pages.

Huawei, "Performance of DL Coordinated Beam Switching under varying traffic loads," 3GPP TSG RAN WG1 Meeting #57 R1-091797, San Francisco, USA, May 4-8, 2009, 9 pages.

Huawei, "Performance of DL Coordinated Beam Switching with Bursty traffic," 3GPP TSG RAN WG1 meeting #57bis R1-092365, Los Angeles, USA, Jun. 29-Jul. 3, 2009, 8 pages.

Mitsubishi Electric, "Leakage-based precoding for CoMP in LTE-A," 3GPP RAN1#55b R1-090028, Ljubljana, Slovenia, Jan. 12-16, 2009, pp. 13.

Mitsubishi Electric, "Leakage-based precoding for CoMP in LTE-A," 3GPP TSG-RAN1#55b R1-090028, Ljubljana, Slovenia, Jan. 12-16, 2009, pp. 17.

Motorola, "CoMP Operation and Evaluation," TSG-RAN WG1 #57 R1-091935, San Francisco, USA, May 4-8, 2009, 5 pages.

Motorola, "Spatial Correlation Feedback to Support LTE-A Mu-MIMO and CoMP: System Opeation and Performance Results," TSG-RAN WG1 #57 R1-091936, San Francisco, USA, May 4-8, 2009, 9 pages.

Motorola, "DL Passive Open Loop CoMP and Performance," 3GPP TSG RAN1#57bis R1-092603, Los Angles, USA, Jun. 29-Jul. 3, 2009, 3 pages.

Motorola, "CoMP Operation Based on Spatial Covariance Feedback and Performance Results of Coordinated SU/MU Beamforming," 3GPP TSGg RAN1#57bis R1-092634, Los Angeles, USA, Jun. 29-Jul. 3, 2009, 10 pages.

Motorola, "Feedback Comparison in Supporting LTE-A U-Mimo and CoMP Operations," 3GPP TSG RAN1#57bis R1-092635. Los Angeles, USA, Jun. 29-Jul. 3, 2009, 5 pages.

Oteri, O., et al.' "Multicell Optimization for Diversity and Interference Mitigation," IEEE Transactions on Signal Processing, vol. 56, No. 5, May 2008, pp. 2050-2061.

Sadek, M., et al., "A Leakage-Based Preceding Scheme for Downlink Multi-User MIMO Channels," IEEE Transactions on Wireless Communications, vol. 6, No. 5, May 2007, pp. 1711-1721.

Samsung, "Inter-Cell Interference Mitigation Through Limited Coordination," 3GPP TSG RAN WG1 Meeting #54, Jeju, Korea, Aug. 18-22, 2008, 8 pages.

Texas Instruments, et al., "Inconsistency between PMI definition and codebook index," 3GPP TSG-RAN Meeting #55 R1-084440, Prague, Czech Republic, Nov. 10-14, 2008, 2 pages.

Qualcomm Europe, "CoMP Cooperative Silencing Hotzone DL Performance," 3GPP TSG-RAN WG1 #55bis R1-090368 Ljubljana, Slovenia, Jan. 12-16, 2008, 10 pages.

Qualcomm Europe, "Signaling for spatial coordination in DL CoMP," 3GPP TSG-RAN WG1 #56 R1-090867, Athens, Greece, Feb. 9-3, 2009, 8 pages.

Zhang, H., et al., "Asynchronous5053 Interference Mitigation in Cooperative Base Station Systems," IEEE Transactions on Wireless Communications, vol. 7, No. 1, Jan. 2008 pp. 155-165.

International Search Report and Written Opinion for International Application No. PCT/CN2010/075871 mailed Nov. 8, 2010, 12 pages.

* cited by examiner

Fig. 1

| Feedback Requirements | Scheduler Complexity | Performance |
|---|---|---|
| CBS | CBS | CBS |
| CBF I/CBF II | CBF I | CBF I |
| CBF I (advertisement) | CBF II | CBF II |

→ Increasing

| | |
|---|---|
| Number (Tx,Rx) | (4,2) |
| Antenna Separation (Wavelength) | (0.5, 0.5) |
| Channel Model | SCM (Urban Macro, 8 degree spread) |
| Scheduler | Proportional Fair |
| Users per Cell | 10 |
| Control Overhead | None |
| HARQ | Pseudo-CC-HARQ as described above |
| Receiver Processing | MRC |
| FFT size, Bandwidth | 1024, 10MHz |
| STS Distance | 500m |
| Link to System | Effective SNR/Mutual Information |
| Shadow Fading | 8dB |
| Isolation | 20dB |
| NB Tx Power | 40W |
| Rank Adaptation | Yes – maximum Rank 2 transmissions |
| UE Speed | 3km/h |
| Subband Size/Scheduling Unit | 5 RB's = 60 tones |

*Fig. 6*

|  | LTE-Ref | LTE-Ref | CBF | MU-MIMO | CBF+MU-MIMO |
|---|---|---|---|---|---|
|  | 4-bit Codebook | 8-bit Codebook | 8-bit Codebook | 8-bit Codebook | 8-bit Codebook |
| Cell Average Throughput (%) | 0 | 0.01 | 0.04 | 0.11 | 0.20 |
| Cell Edge Throughput (%) | 0 | 0.06 | 0.29 | 0.19 | 0.27 |

COORDINATED BEAM FORMING AND MULTI-USER MIMO

This application claims the benefit of U.S. Provisional Application No. 61/234,225, filed on Aug. 14, 2009, entitled "Coordinated Beam Forming and Multi-User MIMO," which application is hereby incorporated herein by reference.

TECHNICAL FIELD

The present invention relates generally to communication and more particularly to a coordinated beam forming and multiple user multiple-input multiple-output (MIMO).

BACKGROUND

In any communication system including several users sharing the transmission medium, i.e., the available communication resources, special attention must be given to the co-existence of the different signals being present within the communication system. The users of the communication system generally share the same pool of communication resources. When allocating the communication resources (for example, different channels) to the multiple users, it is realized that the signal of one user may affect (interfere with) the signal of another user. A communications system designer thus has to design a user traffic multiplexing scheme bearing this in mind, and thus design the multiplexing scheme so as to handle this undesired interference.

In communication systems in which a geographical division is used, e.g., a cellular system, there are mainly two kinds of multi-user interference present. Firstly, the interference from users within the same geographical area, called a cell; the so called intra-cell interference, and secondly the interference from users in adjacent (neighboring) cells; the so called inter-cell interference. When the cell size is small, more than one adjacent cell can interfere with any given cell. In the literature, base station or evolved Node B NB is also a term used for a cell.

eNodeB is also commonly referred to as base station (BS), base transceiver station, controller, access point (AP), access network (AN), and so forth, while a user equipment (UE) may also be commonly referred to as mobile station (MS), access terminal (AT), subscribers, subscriber stations, terminals, mobile stations, and so on.

One of the challenges for OFDM cellular networks such as LTE and/or WiMax includes mitigating inter-cell interference.

SUMMARY OF THE INVENTION

These and other problems are generally solved or circumvented, and technical advantages are generally achieved, by illustrative embodiments of the present invention.

In one embodiment, a method of wireless communication comprises receiving a first reference signal from a serving base station in a cell at an user equipment. A second reference signal is received from an adjacent base station in a neighboring cell. The method includes determining if a signal strength of the second reference signal is above a threshold. A feedback is transmitted from the user equipment. The feedback comprises information of the first reference signal. The feedback further comprises information of the second reference signal if the signal strength of the second reference signal is above the threshold.

In another embodiment, a method for wireless communication comprises receiving cell information for a cluster of cells to be coordinated. A first cluster scheduling order used for the cluster of cells is retrieved. The first cluster scheduling order represents a sequence in which the cluster of cells were scheduled in a previous schedule. A second cluster scheduling order is generated. The second cluster scheduling order determines a sequence in which the cluster of cells are scheduled in an upcoming schedule. The second cluster scheduling order is decided based on the first cluster scheduling order and/or the cell information. The second cluster scheduling order is transmitted to the cluster of cells.

In yet another embodiment, a method for wireless communication comprises selecting a user equipment for a sub-band that minimizes interference to already scheduled user equipments. A primary priority function for each user equipment to be scheduled is calculated as a function of a penalty function and a signal to noise ratio. A user equipment with a highest primary priority function for that sub-band is selected.

In yet another embodiment, a method for wireless communication comprises selecting a user equipment for a sub-band that minimizes interference to already scheduled user equipments. A primary priority function for each user equipment to be scheduled is calculated as a function of a penalty function and a signal to noise ratio. The user equipment with a highest primary priority function for that sub-band is selected.

In an alternative embodiment, a method for mode adaptation in a wireless communication comprises scheduling a first plurality of user equipments comprising N−1 user equipments. An incremental capacity for adding another user (UE (j)) is calculated. The another user is added if the incremental capacity is greater than a safety factor multiplied by an original capacity.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

A block diagram of embodiment UE is illustrated in FIG. 9; and

A block diagram of an embodiment NB is illustrated in FIG. 10.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

OFDMA systems can be deployed as a frequency reuse-1 system where all cells transmit over the same frequency spectrum. A frequency reuse-1 is desirable as it improves the spectrum efficiency and therefore the throughput. However, due to the inter-cell interference, the cell edge UE's coverage will suffer. Further, this problem as described further below increases with a decrease in cell size.

Figure 1:
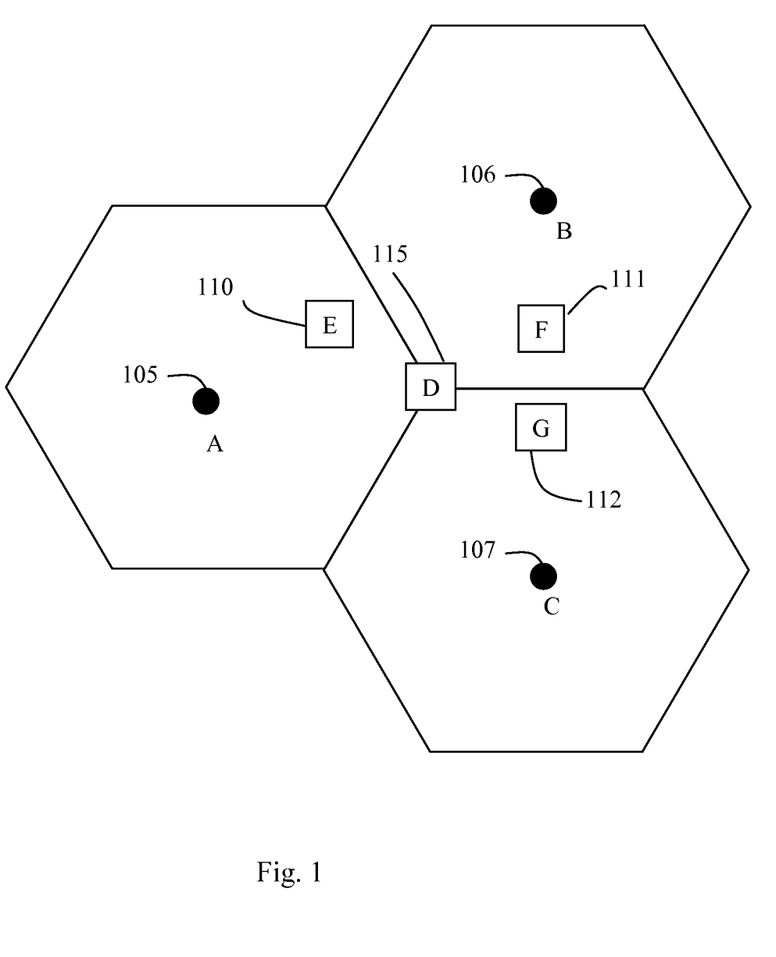
FIG. 1 illustrates a wireless communications system in accordance with embodiments of the invention.

FIG. 1 illustrates a wireless communications system in accordance with embodiments of the invention. As illustrated a cluster of cells serve multiple users in the wireless communications system.

Wireless communications system 100 includes base stations, such as NB A 105, NB B 106, and NB C 107. Each BS may control communications within a certain area such as cells A, B, and C. Each cell has multiple transmit antennas at a transmitter of the NB. Each cell (or NB) typically has a number of users (or UE's) that it serves over a period of time. As an illustration, wireless communications system 100 also includes user equipments such as UE E 110, UE F 111, and UE G 112, with UE E 110 operating in a cell controlled by UE A 105 (cell A), UE F 111 operating in a cell controlled by NB B 106 (cell B), and UE G 112 operating in a cell controlled by NB C 107 (cell C). Further, in various embodiments, the number of NBs serving a UE may be more than three.

If these cells are close to each other, a decision that a first NB makes has an impact on a second NB. For example, these NB's will typically use their transmit antenna arrays to form beams. Therefore, if a first NB decides to serve a first UE in a particular time-frequency slot, it will form a beam pointing to that UE. However, this beam will extend into a second cell's area and cause interference to UE's being served by the second NB. For example, if NB C 107 directs a beam pointing to UE G 112 served, UE F 111 in cell B may receive the signal as interference.

This small cell scenario is known as an interference limited cell scenario which is different from a noise limited cell scenario (which is typical for large cells). The amount and type of interference that a first NB causes to UEs in a second NB's area, will depend on which UE the first NB chooses to schedule in that particular slot. Typically and until recently, each NB would independently make such scheduling decisions and let every UE deal with these interference fluctuations independently.

One typical solution is that a NB applies some safety back off margin to any reported Channel Quality Indicator message (CQI) from a UE to its serving NB. The NB will then use this "backed off" version of CQI during link adaptation to determine the Modulation and Coding Selection (MCS) level. Another method is to calculate average measured CQI's in order to average out the fluctuations in CQI. This averaging may be performed by either the UE or NB.

Another solution is described as Coordinated Beam Switching (CBS). In CBS schemes, the scheduler in each NB, cycles through a grid-of-beams in a deterministic way. The UE signals the desired combination of serving cell and interference cell beams implicitly by sending a CQI feedback corresponding to a specific time slot in the cycle period in the serving cell.

In CBS, the NB's follow a predefined beam cycling pattern. Therefore, in CBS, a particular NB's use of a particular beam in a slot is predetermined. Such a scheme solves the problem of CQI variations. Even though this approach works well in heavily loaded cells, its performance degrades in lightly loaded cells especially with very bursty traffic, where the traffic and therefore the beams cannot be predicted accurately for long periods.

In various embodiments described below, a Coordinated Beam Forming (CBF) method is described that overcomes these and other limitations. In various embodiments, every cell actively avoids causing interference to the already scheduled UE's in other cells. This means that the scheduling decision of a second NB is a function of scheduling decisions already made in a first NB. Hence, the coordination level between the cells is higher than the CBS schemes, wherein the coordination is limited to a frame level beam periodicity.

In accordance with various embodiments, in Coordinated Beam Forming (CBF) or scheduling, the user scheduling or beam forming decisions are made with coordination among all the cells in the coordinating cell set while data is transmitted from the serving cell only. This is different from joint processing in which data can be transmitted from multiple cells in the coordinating cell set.

CBF is grouped into three classes: Type I, Type II, and a Type III schemes. In CBF Type I, the design of the precoder is independent of the scheduler. The precoder is a fixed design (e.g., max eigenvalue of the channel), and the UEs are then conditionally scheduled in subsequently scheduled cells based on UE/precoder selections in previously scheduled cells.

In CBF Type II schemes, the precoder design and the scheduler are inter-dependent. Each NB knows the UEs scheduled to transmit in the coordinating set. The precoders are then designed based on the interference offered to or from the scheduled UEs.

Figure 2:
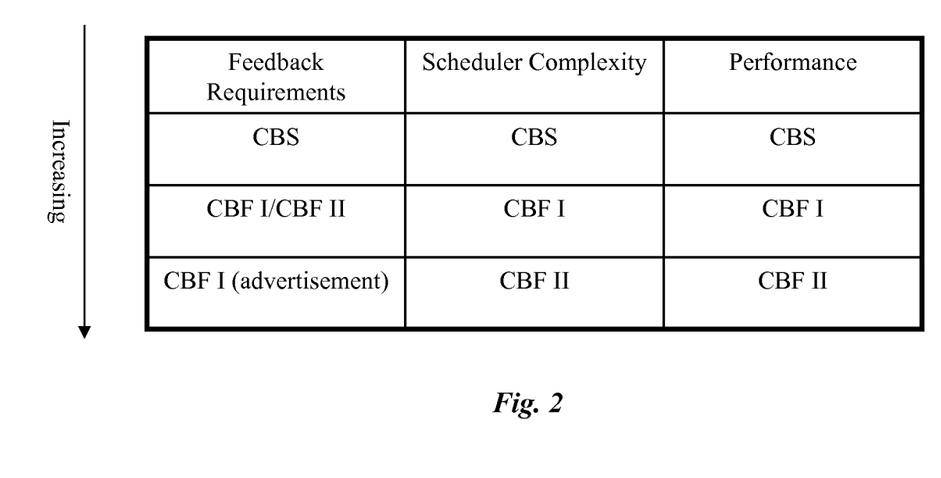
FIG. 2 illustrates the trade-offs in the scheduling and feedback complexity with improving performance with various coordinated beam forming schemes.

There are trade-offs in the scheduling/feedback complexity and the performance of the three classes. These tradeoffs are presented in FIG. 2, which illustrates the trade-offs in the scheduling/feedback complexity versus performance. In particular, the feedback requirements and scheduler complexity increase from CBS to CBF Type I, and further gain from CBF Type I to CBF Type II. Hence, the improvement in performance comes at the expense of increasing complexity.

In various embodiments of this invention, a CBF Type I technique is described that uses multi-cell coordinate beam forming with single cell multi-user MIMO and overcomes these and other limitations. Embodiments of the invention reduce feedback complexity by selectively sending quantized channel state information of the relatively important interfering cells.

Embodiments of this invention include a scheduling controller that controls the order of NB being scheduled. Embodiments of this invention also include an enhanced scheduler at each NB and communication between NBs and improved feedback functionality at UEs. Accordingly, each of these operations will be described in accordance with embodiments of the invention. First, a scheduling controller will be described using FIG. 3. This is followed by a description of the UE feedback using FIG. 4. Then, embodiments for the operations at the NB will be described using FIG. 5.

Figure 3:
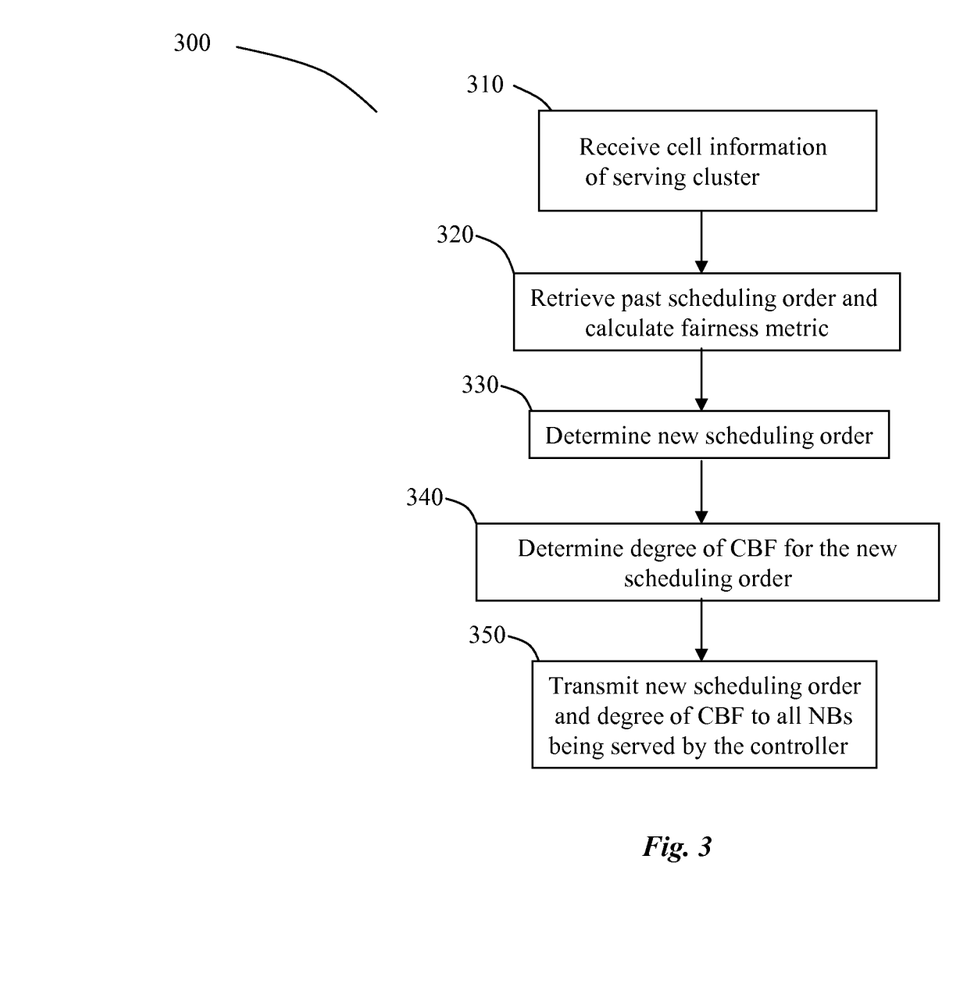
FIG. 3 illustrates a flow diagram of scheduling controller operations in providing with a dynamic scheduling order for the NBs in the cluster, in accordance with embodiments of the invention.

FIG. 3 illustrates a flow diagram of scheduling controller operations in providing with a dynamic scheduling order for the NBs in the cluster, in accordance with embodiments of the invention.

As illustrated in FIG. 1, CBF is achieved for a plurality of NBs forming a local cluster. The cluster of cells to be coordinated (the coordinating cell set) is first selected and a cluster scheduling order is decided upon. The cluster scheduling order determines the order in which the cells are scheduled and as such, the amount of deterministic interference that will be seen by each cell. In various embodiments, this cluster scheduling order is decided dynamically, for example, based on current conditions.

A scheduling controller having the scheduling order operations may be included within one of the NBs within the cluster of NBs or alternatively, the scheduling controller may be located within a gateway server communicating with all the NBs in the cluster. Therefore, in one embodiment, the scheduling controller operations may be indicative of operations occurring in a NB, such as NB 105 in FIG. 1. Scheduling controller operations may occur while the NB is in a normal operating mode and while the NB and the UEs continue to communicate using CBF.

FIG. 3 illustrates the scheduling controller operations 300 that result in a scheduling order of the NBs that form the cluster. Referring to FIG. 3, a scheduling controller receives cell information from each of the NBs in the cluster (box 310). The cell information may include loading information for each NB in one or more embodiments. The NBs transfer statistical information regarding the UE loading to the scheduler controller in one embodiment.

In various embodiments, the NBs may also transfer further statistics on the UEs that are being served including number of edge and center UEs. In various embodiments, the UEs may be classified differently, e.g., based on the actual geographic configurations of the cells. Alternatively, the cell information may include priority information of the UEs. For example, UEs may be classified with different priority and the cell information from the NBs to the scheduling controller may include the priority information for each of the UEs.

The scheduler controller may also retrieve the previous scheduling orders (box 320). In one embodiment, the previous history of scheduling orders may be retrieved. The previous history may be used as a fairness criterion. For example, in one embodiment, a first NB that had a higher priority than a second NB in the previous scheduling order may have less priority than the second NB in the upcoming scheduling order.

Based on various inputs and past history, the scheduling controller determines a new scheduling order (box 330). In making this determination, the scheduling controller may use inputs from the NBs and/or the past history. In one embodiment, the scheduling controller uses UE loading information to determine a new scheduling order. In such an embodiment, the scheduling controller may give priority to a cell having a higher loading than a cell having lower loading. This is because a cell having a higher loading has less options in scheduling. Therefore, it is more preferable to give the cell with the higher loading a higher priority than a less loaded cell. In one case, loading information comprises a total number of user equipments in each cell of the cluster of cells. In one case, the scheduling controller gives more priority to cells having more total number of UEs than cells having less total number of UEs.

In another embodiment, the scheduling controller gives more priority to cells having more number of UEs reporting other interfering cells. Similarly, in another embodiment, the scheduling controller gives a higher priority to cells reporting a higher interference power for the interfering cells. In another example, the scheduling controller gives more priority to cells with UEs having a higher cumulative throughput.

Similarly, in an alternative embodiment, the scheduling controller may give priority to a cell having more edge UEs than a cell having more core UEs. If two cells have similar loading, in one embodiment, the controller may assign priority based on previous scheduling order such that the cell that had a higher priority in the last scheduling order receives a lower priority in the subsequent scheduling order.

In an alternative embodiment, each subsequent cell in the order is chosen as the cell that is most influenced by the already scheduled cells. In various embodiments, this may be determined from either the most number of UEs reporting interferers, and/or the highest interference power.

As illustrated in box 340, the scheduling controller may also determine the degree of coordinate beam forming (gamma γ), as will be described further below. For example, if the NBs are lightly loaded, the scheduling controller may decide not use CBF because of minimal interference while if the NBs are heavily loaded the scheduling controller may use maximum CBF. Steps 330 and 340 may be performed in parallel or in any sequence in various embodiments. The scheduling controller next transmits the new scheduling order and the degree of CBF that has been determined in the previous steps to all the NBs in the cluster (box 350).

In various embodiments, as described, the cluster controller dynamically determines a NB scheduling order. In various embodiments, this order may be selected to ensure fairness, based on cell loading, and/or based on user distribution in a cell. For example, in one case, a cell with few cell edge users may have a lower ranking in the scheduling order compared to other cells having more cell edge user (everything else being equal).

Figure 4:
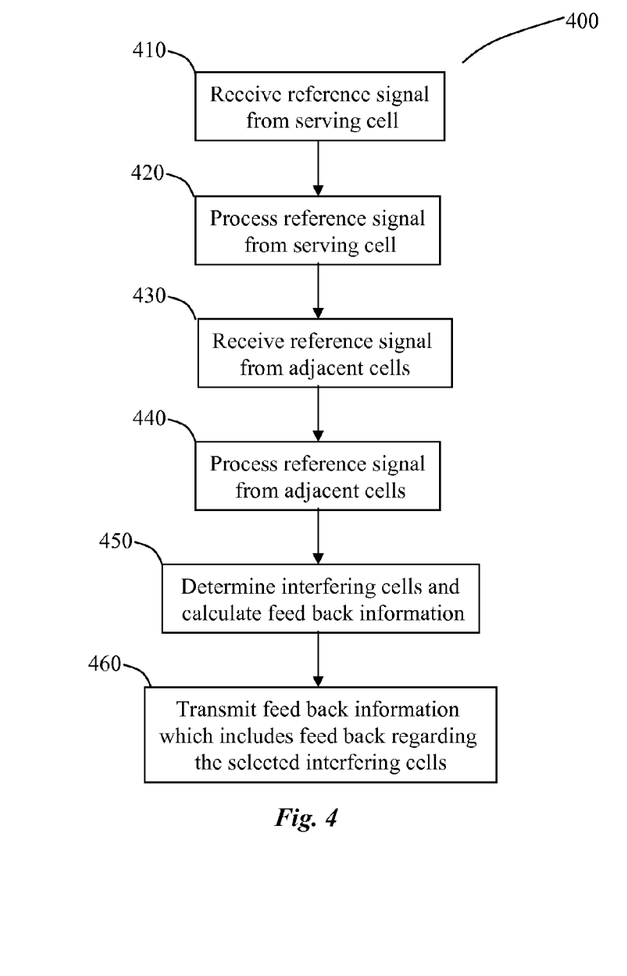
FIG. 4 illustrates UE feedback operations for coordinated beam forming in accordance with embodiments of the invention.

UE feedback operations are next described in accordance with embodiments of the invention. FIG. 4 illustrates UE feedback operations 400 for coordinated beam forming in accordance with embodiments of the invention.

In various embodiments of the invention, each UE will send a feedback comprising a quantized channel based on a codebook for both the channel to its serving cell, as well as to the channel to a number of strongest interferers. In various embodiments, different codebooks could be used between serving cell channels and interfering cell channels.

UE operations 400 may be indicative of operations occurring in a UE, such as UE 110, UE 111, UE 112, or UE 115 in FIG. 1, and a NB set, such as NB 105, NB 106, and NB 107, participating in CBF communication.

Referring to FIG. 4, each UE receives a reference signal from the serving cell (step 410). For example, the UE G 112 receives a reference signal from NB C 107. In one or more embodiments, the reference signal may be a specific pilot signal or a general pilot signal that assists the UE in measuring the channel.

Next, as illustrated in step 420, the UE processes the reference signal. In one embodiment, the UE estimates the reference signal measured power (signal strength) of the reference signal from the serving NB. Based on the measurements, the UE may also estimate the channel conditions between the UE and the serving NB.

The UE also receives reference signals from adjacent cells (step 430). For example, in FIG. 1, the UE G 112 may also receive reference signals from NB A 105 and NB B 106. The reference signals received at the UE may be reference signals broadcast by the NBs or may be specifically targeted reference signals for the UE.

The UE processes the reference signal for each of the reference signals received at the UE from adjacent cells (step 440). In one embodiment, the UE calculates the reference signal received power for each reference signal from the adjacent cells. The UE may also determine other metrics for identifying the interference level with the adjacent cells. In one embodiment, the UE estimates the channel conditions between the UE and the adjacent cells. For example, in one case, the UE calculates the precoding matrix indices based on the reference signal for each cell.

Next, the UE identifies the adjacent cells for which feedback will be provided (step 450). In various embodiments, the UE provides feed back only to offset the interference from the most important interferers. In one or more embodiments, the UE estimates the reference signal received powers (RSRPs) of adjacent cells that are above a predetermined threshold. In one embodiment, the UE determines if the interference is significant enough to warrant the additional feedback. Hence, the UE evaluates how a reference signal received power (RSRP) from a serving cell compares with a RSRP from an interfering cell. For example, the UE evaluates if the ratio RSRP(serving cell)/RSRP(interfering cell) is less than the predetermined threshold value. If the ratio is less than the threshold value, the interfering channel information is included in the feedback from the UE. In one embodiment, (and in simulations described below), a threshold of 6 dB was chosen while any other threshold could be used in other embodiments.

The UE thus feeds back the identified channel conditions, such as channel quality information, between the serving cell and the UE to the NB (step 460). Increasing the number of interfering channels in the UE feedback, increases the feedback overhead. The increased feedback also increases restrictions on the NB scheduler. These increased restrictions reduce the average cell throughput. Therefore, in various embodiments, the number and amount of interfering cells reported is carefully evaluated in order to strike a good balance between feedback overhead, cell edge performance, and cell average performance. Also, excessive feedback information may cause NB's buffer to overflow and the additional interferers may simply be ignored by the NB scheduler.

Therefore, in various embodiments, the feed back from the UE includes information regarding the adjacent cells that are the predominant interferers. For example, in FIG. 1, the UE G 112 may decide that the interference of NB A 105, for example, determined from the power of the reference signal from NB A 105, is much smaller than the interference of NB B 106. Therefore, the feedback from UE G 112 may only include the interference information of NB B 106.

In various embodiments, the feedback from the UE to NB may be broadcast or specifically targeted to the serving NB. In various embodiments, the feedback information for the serving channel as well as the interfering cells is quantized, e.g., using a codebook, to minimize the feed back load. The quantized codebook may be precoding matrix indices (PMI), which are indices of a table, and a NB can use these indices to obtain the precoding matrix.

NB PMI usage for data transmission is described in accordance with an embodiment of the invention. In one embodiment (and in the simulations described below), the NB uses the PMI reported by the UE directly during data transmission. However, in other embodiments and considering the presence of dedicated reference signal (RS) for the downlink, the NB does not need to be restricted to using the same PMI, but rather it can calculate the precoder weights based on some criteria, e.g., zero forcing or signal to interference leakage ratio SILR. These criteria-based weights may or may not be communicated to other NB's, based on how similar they are to the original reported weights in the PMI of the codebook. In one embodiment, if the calculated precoder weights are similar to the original reported weights in the PMI of the codebook, the NB may not communicate the changes to other NB's.

An enhanced NB scheduler is next described in accordance with an embodiment of the invention. In accordance with embodiments of the invention, a utility-based multi-cell, multi-user scheduler is described. The scheduler uses a utility function to select multiple UEs per cell in a manner that reduces the amount of inter-cell interference by coordinate beam forming. In addition, in various embodiments, the scheduler incorporates a single user per cell/multi-user per cell mode adaptation.

A multi cell scheduler is described in accordance with an embodiment of the invention. The scheduler described below operates per NB with some input from other cells.

Figure 5:
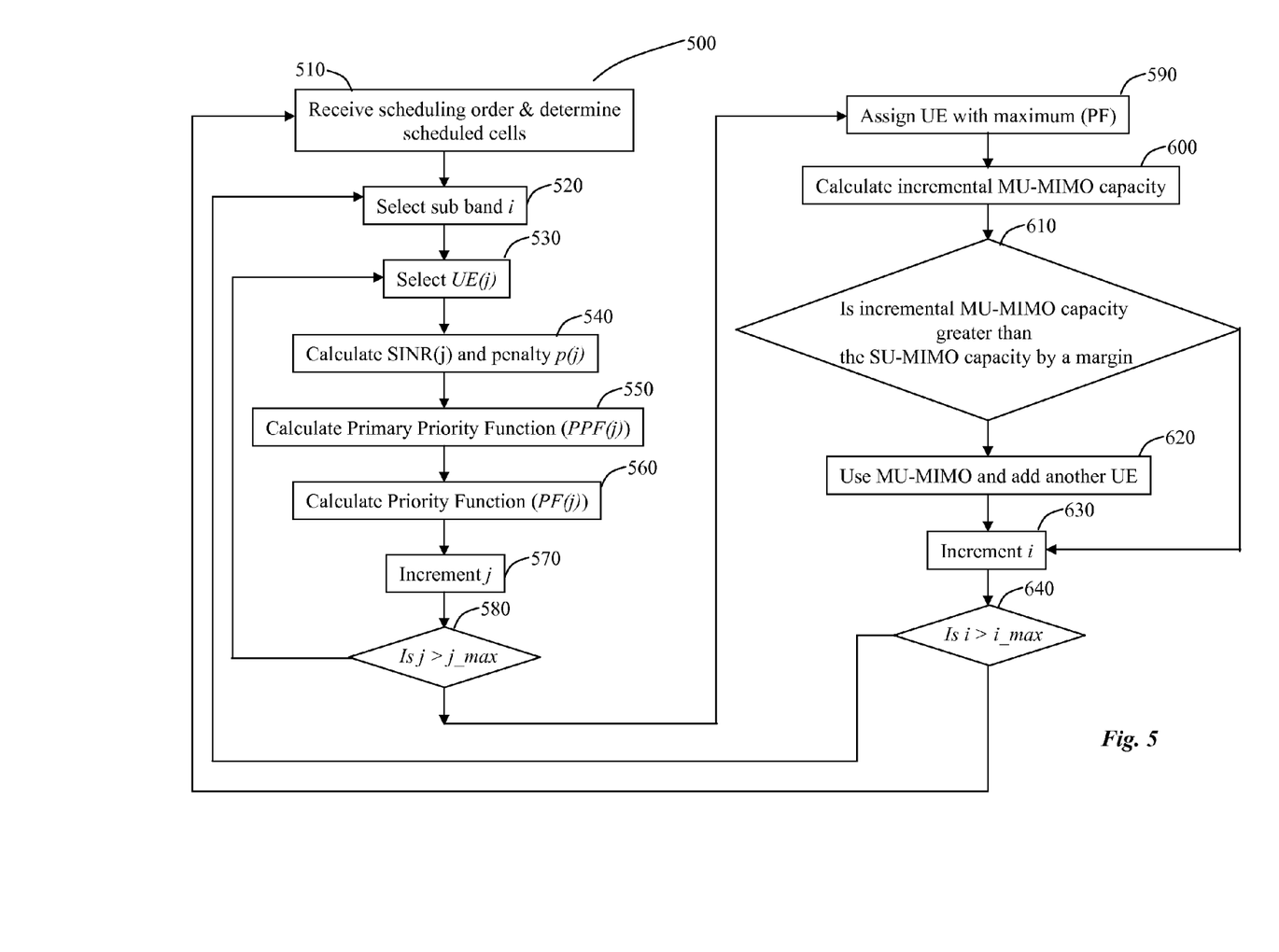
FIG. 5 illustrates scheduling operations performed at a multi-cell, multi-user scheduler in accordance with embodiments of the invention.

The scheduling operations performed at a multi-cell, multi-user scheduler is described using FIG. 5 in accordance with embodiments of the invention. In various embodiments, the multi-user scheduler at each NB assigns UE within the NB while minimizing inter cell interference using coordinated beam forming.

For the cluster of cells being served under the scheduling controller (cells forming the CBF), the total number cells in the cluster is N, each UE is uniquely represented as UE(cell n), and a scheduler s(n, t), where n is the cell ID (1, 2, . . . , N) and t is the time slot that the scheduler is run. Ideally, with CBF for cell 1, UE(cell 1)→{s(1,t)|s(2,t), s(3,t), . . . , s(N,t)},
UE(cell 2)→{s(2,t)|s(1,t), s(3,t), . . . , s(N,t)}, and
UE(cell n)→{s(n,t)|s(1,t), . . . , s(n−1,t), s(n+1,t), . . . , s(N,t)}.

The optimal scheduler {s(1,t), . . . , s(N,t)} requires a complex joint optimization. Embodiments of this invention implement a conditional scheduler.

Assume that without loss of generality, as described above, the scheduling controller establishes the scheduling order (SO) such that SO→{1, 2, 3, . . . , N}. Next, we schedule the UE in cell n+1 based on the UEs scheduled in cells→{1, 2, . . . , n}. Thus, the conditional scheduler becomes UE(cell1)→{s(1,t)},
UE(cell2)→{s(2,t)|s(1,t)}, and
UE(celln)→{s(n,t)|s(1,t), s(2,t), . . . ,s(n−1,t)}.

The scheduler per cell is implemented as a conditional scheduler that coordinates its beam to reduce interference to the already scheduled cells. In addition, it may select multiple UEs per cell.

Referring to FIG. 5, the NB receives the cluster scheduler order from a scheduling controller as described above (step 510). The NB uses the scheduling order to identify the NBs that are scheduled ahead of the NB in the scheduling order.

In one embodiment, each sub band (frequency bin) is scheduled independently of each other sub band. Accordingly, the scheduler selects a sub band for which to assign an optimal UE (step 520). However, this is just an example and any other scheduler may be used. For example, in another embodiment, a scheduler where a previous sub band is considered is implemented where the throughput (THP) variable is updated after each scheduling decision has been taken on a given band. Effectively, the THP variable changes after every scheduling decision.

From a physical layer interference perspective, embodiments of the invention describe an interference avoidance scheduler, where the scheduler tries to select an UE that causes the least interference to existing scheduled UEs. The scheduler retrieves the UE Id's of UEs already allocated to other NBs in the sub band. This is possible because the interfering users have already been scheduled in this subband.

In various embodiments, the NB then calculates a metric for each UE(j) that needs to be scheduled for that cell (step 530), wherein the total number of UE to be scheduled for that cell by the NB is j_max. The scheduler calculates the signal to interference noise ratio (SINR(j)) for the UE(j) (step 540).

As next illustrated in step 550, the scheduler calculates the Primary Priority function PPF(j) for each UE(j). The PPF(j) is determined as PPF(j)=SINR(j)·p(j)

where the penalty is described as $$p(j) = 1 - \gamma * \max_k \{|w^H(j)w(InterferingUE[subband][k])|^2\}.$$

The penalty $\rho(j)$ is the maximum correlation of UE(j)s precoding matrix index (PMI) with all the already scheduled UE's in other cells, as well as other space division multiple access (SDMA) scheduled UE's in current cell. Here w(i) represents the codebook based quantized channel between UE(j) and this NB, and $\gamma$ is a penalty factor that from varies from 0 to 1, and determines the importance of the CBF component.

In various embodiments, the penalty factor may be obtained from the scheduling controller. For example, if $\gamma=0$, then the system goes to the reference (no CBF) case, while if $\gamma=1$, the system is equivalent to a full CBF scheme. In one embodiment, the scheduling controller defines gamma to be closer to 0 when the cells are lightly loaded and increases gamma when the cells are heavily loaded. Therefore, assuming $\gamma=1$, when the interference as measured by the inner product of the codebook based quantized channel between UE(j) and this NB w(j) and w(InterferingUE[subband][k]) increases thereby decreasing the penalty factor p(j). The lowered penalty factor p(j) reduces the corresponding primary priority function PPF(j) for the UE(j). The effect of using the penalty is to select a UE that is spatially far away from all the already scheduled UEs.

In alternative embodiments the penalty function is defined differently. For example, in one embodiment, the penalty function may be defined as follows.

$$p(j) = \frac{1}{\varepsilon + \gamma * \max_k\{|w^H(j)w(InterferingUE[subband][k])|^2\}}.$$

Gamma $\gamma$ and epsilon $\epsilon$ are constants and determine the degree of coordinated beam forming allowed.

In an alternative embodiment, the precoder correlation combined with received interference power is used. This allows for UEs that are far away to not have as much influence instead of treating all interfering UE as equal. The penalty is defined as:

$$p(j) = w^H(j)R^{-1}w(j),$$

and $$R = \sum_{k=0}^{k-1} \beta(k)w(k)w^H(k) + \sigma^2 I.$$

where $\beta(k)$ represents the received signal power from interferer k, and $\sigma^2$ is the thermal noise power. The effect of this is to select a UE that is spatially far away from all the already scheduled UEs.

In yet another embodiment, the penalty is calculated based on the interaction between a precoder and the effective channels to the desired UE. We assume that the precoders are designed based on the effective channel/channel correlation to the currently scheduled UEs. Examples include maximum eigenvector transmission, zero forcing receivers for already scheduled UEs, and signal to leakage ratio for already scheduled UEs. In this case, w(j) is the precoder for UE(j), while w(InterferingUE[subband][k]) and R are as previously defined in the prior embodiments.

As next illustrated by step 560, a utility priority function PF(j) is calculated. In various embodiments, the priority function PF(j) is directly proportional to PPF(j) and inversely proportional to a fairness metric. In one embodiment, the PF(j) is calculated as follows.

$$PF(j) = \frac{\log_2(1 + PPF(j))}{THP(j)},$$

where THP(j) could be the total cumulative throughput experienced by the UE up until this time, or any other measure of past performance. Similarly the $\log_2(1+PPF(j))$ function could be replaced by any other function of PPF(j) that would represent throughput given current conditions. Therefore, a UE(j) that has used more resources is given a lower priority.

As illustrated in steps 570 and 580 of FIG. 5, the steps of calculating SINR(j), PPF(j), and PF(j) are repeated after incrementing the variable j until j reaches j_max, which is the total number of UEs to be scheduled by the NB.

As next illustrated in step 590, after all UE(j)s have been calculated, the UE having the highest PF(j) is assigned to the i-th sub band. This ensures that the selected UE is least susceptible to interference from neighboring cells.

An embodiment of the invention for rank adaptation is next described (steps 600, 610, and 620). In rank adaptation, each NB decides independently whether to transmit in single user (SU) or multi-user (MU) mode. The switch to MU-mode is made if the incremental capacity over the SU-mode is greater than some threshold, i.e., Cap(MU)/Cap(SU)>Threshold.

In various embodiments, this method implements a rather rough but simple check to see if a space division multiple access (SDMA) user should be added. In various embodiments, a SDMA user is added if the following inequality is satisfied.

$$\sum_{j=0}^{1} CapVal(j) - 2 > \alpha \cdot CapVal(0),$$

where, CapVal(j) is the Shannon capacity of UE(j) if it was scheduled alone. This is derived from:

$$\log_2(1+SINR_j/2) = \log_2(2+SINR_j) - \log_2(2) \approx CapVal(j) = 1,$$

so that the SDMA capacity has to be higher than the non SDMA capacity by some margin (α), thus:

$$\sum_{j=0}^{1} CapVal(j) - 2 > CapVal(0) \cdot \alpha.$$

wherein, in one embodiment, α=120% is used, but any other suitable value can be used. Therefore, if the above inequality is satisfied, i.e. the incremental MU-MIMO capacity is greater than the original capacity of a single user by a margin, the scheduler switches to MU-mode and adds the UE (step 620).

In general, this can be extended to N−1 already scheduled UE's when deciding to add the Nth UE. Accordingly, the criteria is then:

$$\sum_{j=0}^{N-1} CapVal(j) - N\log_2(N) > \left[\sum_{j=0}^{N-2} CapVal(j) - (N-1)\log_2(N-1)\right] \cdot \alpha.$$

The accuracy of this method decreases for larger values of N.

Referring next to steps 630 and 640, the sub band variable is incremented and the assignment of the UE is performed until all the sub bands have been assigned or all UEs are assigned.

Performance evaluations using embodiments of the invention are described below. The simulation results using a per sub band scheduler is described with respect to FIGS. 6, 7, and 8. Thus each subband is scheduled independent of previous subbands.

Details of the Pseudo HARQ simulations are described below. This function updates the UE throughput based on Pseudo HARQ process performed at the NB. This function does not simulate the Chase Combining (CC) HARQ explicitly. It calculates the throughput (THP) based on the packet FER, if the packet has been received in error or not. If there is no error, it updates the THP variable and increments a NumACK counter. If in error, it calculates how many retransmissions would be required based on the current channel conditions, and updates the THP as:

THP=THP(without error)/Number of expected retransmissions.

Subsequently, the NumNACK counter is incremented.

Figure 6:
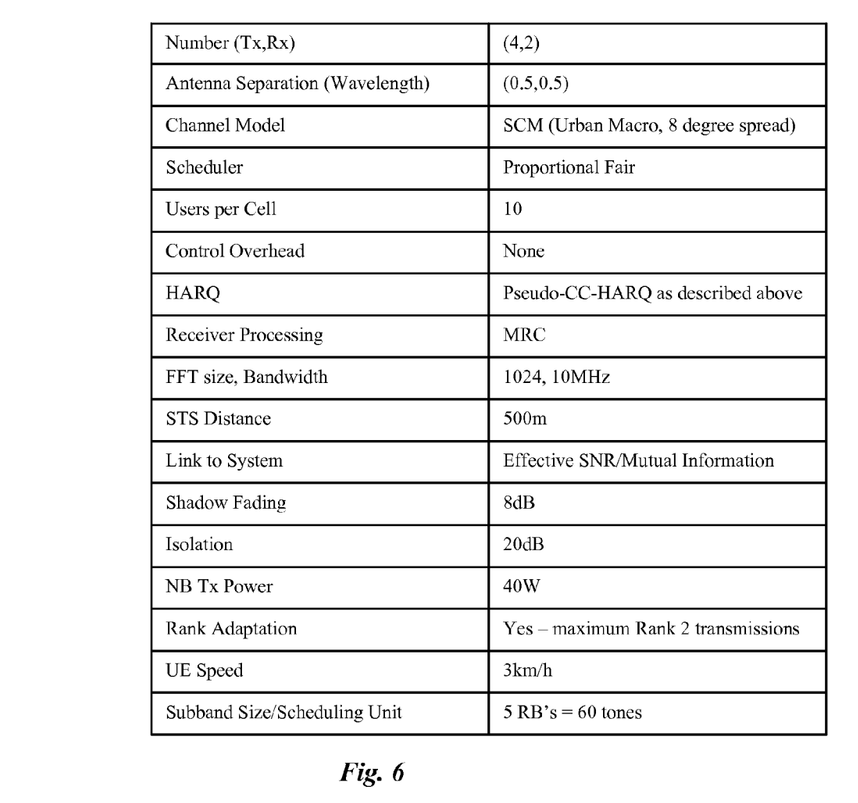
FIG. 6 summarizes the system simulation settings performed in accordance with embodiments of the invention to evaluate the performance of a CBF scheme and CBF combined with MU-MIMO when using coordinated techniques.

FIG. 6 summarizes the system simulation settings performed in accordance with embodiments of the invention to evaluate the performance of a CBF scheme and CBF combined with MU-MIMO when using coordinated techniques.

Figure 7:
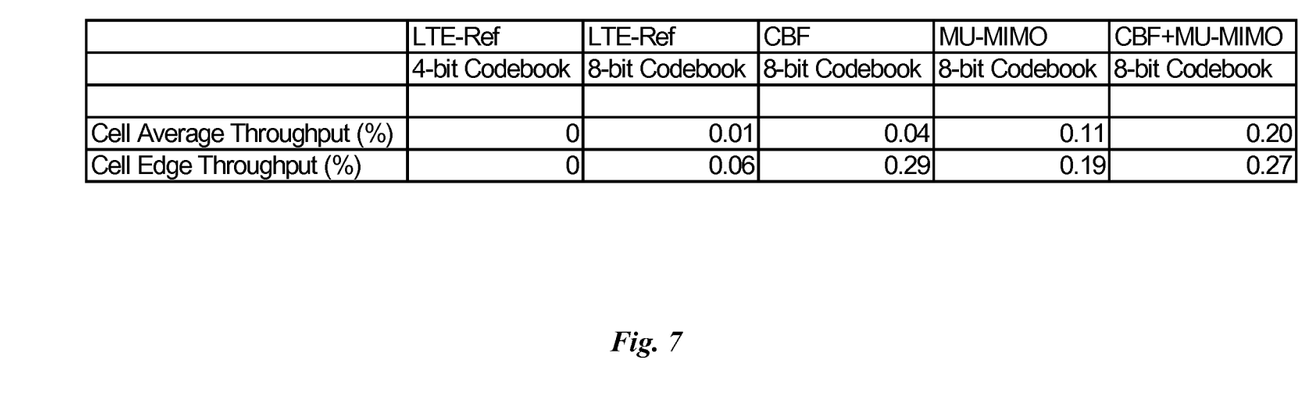
FIG. 7 illustrates the cell average and cell edge gains of the various embodiments that were simulated.
Figure 8:
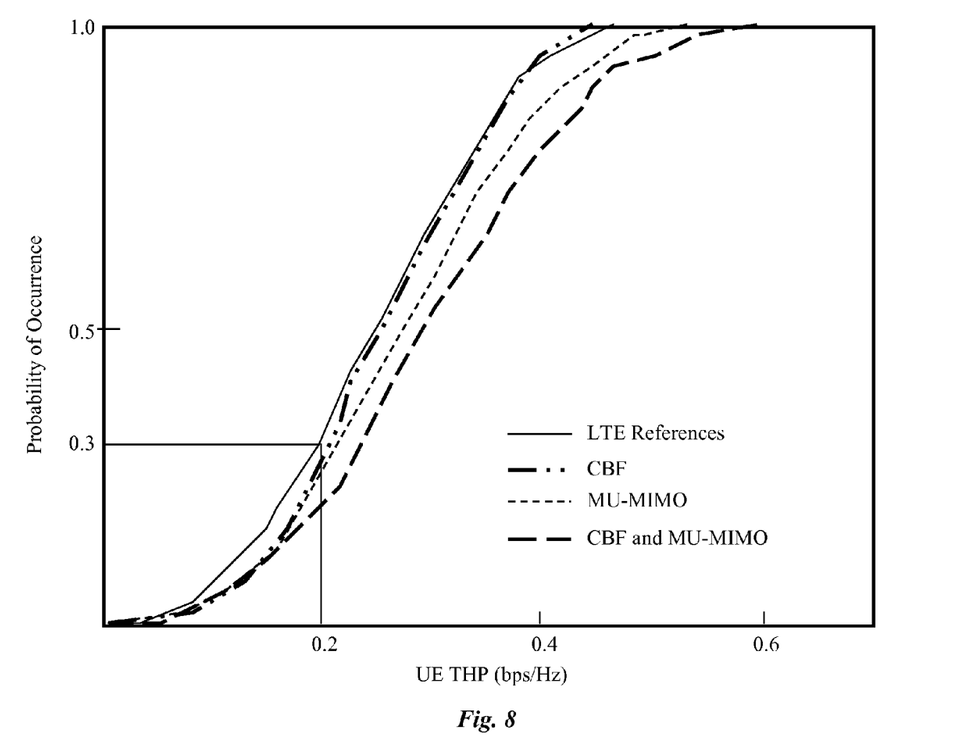
FIG. 8 illustrates the UE throughput for the various embodiments of the invention that were simulated.

A summary of the simulations is illustrated in FIG. 7. In particular, the cell average and cell edge gains of the various embodiments that were simulated are summarized in FIG. 7. FIG. 8 illustrates the UE throughput for the various embodiments of the invention that were simulated.

The following schemes are simulated:

Scheme 1: LTE-Ref (4-bit codebook): Scheme 1 is the reference scheme. The scheme has no coordination between the eNB's and uses the 4-bit codebook specified in Rel 8;

Scheme 2: LTE-Ref (8-bit codebook): This also has no eNB coordination but uses an 8-bit DFT codebook;

Scheme 3: CBF (8-bit codebook): In this scheme, each eNB schedules only one UE per cell. The scheduler in each NB selects a UE based on information from eNB's that have already been scheduled in the coordinating cell set;

Scheme 4: MU-MIMO (8-bit codebook): In this scheme, more than one UE can be scheduled per eNB. However, there is no coordination between eNBs;

Scheme 5: CBF and MU-MIMO (8-bit codebook): In the CBF and MU-MIMO scheme, each NB can schedule up to 2 UEs per cell in a MU-MIMO way. Scheduling is coordinated between cells in the coordinating cell set.

FIG. 8 illustrates a cumulative distributive function showing the probability of occurrence of a particular UE throughput (bps/Hz/Cell). For example, for the LTE references, 30% of the users receive a throughput of about 0.2 bps/Hz. Referring to FIG. 8, there is no benefit in changing the size of the codebook for the LTE-Reference cases (schemes 1 and 2), which are labeled as LTE references. With CBF (scheme 3), an improvement in the cell-edge performance (29%) is observed while there is not much improvement in the cell center performance (4%). Therefore, CBF shows improvement at light loading.

With MU-MIMO (scheme 4), an improvement in both the cell edge and cell center performance (19% and 11% respectively) is observed. However, CBF alone shows a much greater improvement at the cell edge. Combining MU-MIMO with CBF (scheme 5) gives the best of both worlds with significant increases in both the cell center and cell edge performance.

Figure 9:
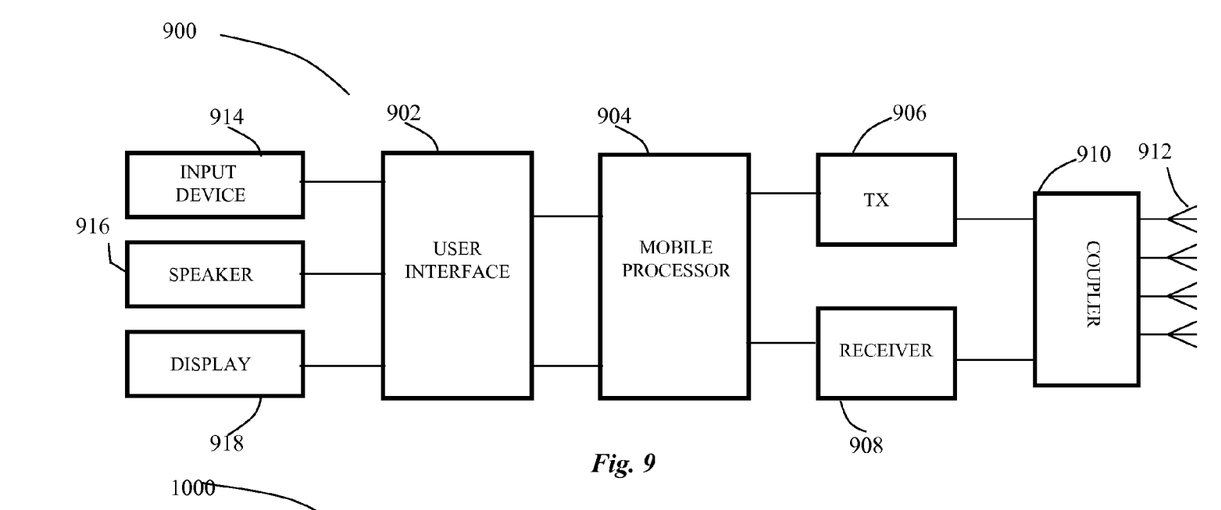

A block diagram of embodiment UE 900 is illustrated in FIG. 9. UE 900 can be, for example, a cellular telephone or other mobile communication device, such as a computer or network enabled peripheral. Alternatively, UE 900 can be a non-mobile device, such as a desktop computer with wireless network connectivity. In various embodiments, UE 900 may be UE 110, UE 111, UE 112, or UE 115 illustrated in FIG. 1.

UE 900 has mobile processor 904, transmitter (TX) 906 and receiver 908, which are coupled to antenna 912 via coupler 910. The transmitter (TX) 906 and the receiver 908 may comprise a common circuitry or may be comprise separate circuitry. In one or more embodiments, the embodiments of the invention described with respect to FIG. 4 may be implemented as hardware within the transmitter 906 and/or the receiver 908, or as a separate circuitry. Some of the algorithms, such as to implement the operations illustrated in FIG. 4, may also be implemented as software executed using the mobile processor 904.

User interface 902 is coupled to mobile processor 904 and provides interfaces to input device 914, speaker 916, and display 918, for example. Alternatively, UE 900 may have a different configuration with respect to user interface 902, or user interface 902 may be omitted entirely. The UE 900 may have multiple transmitters, receivers and antennas to support MIMO operation.

Figure 10:
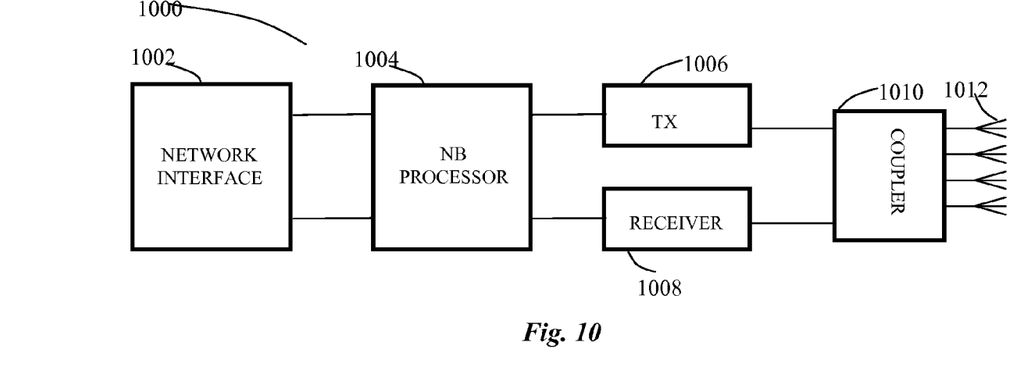

A block diagram of an embodiment NB 1000 is illustrated in FIG. 10. NB 1000 has NB processor 1004 coupled to transmitter (TX) 1006 and receiver 1008, and network interface 1002. Transmitter 1006 and receiver 1008 are coupled to antenna 1012 via coupler 1010. The eNB processor 1004 executes embodiment methods and algorithms as described above, for example, in FIG. 5.

In one or more embodiments, the NB operations 500 (FIG. 5) as described above may be implemented within the transmitter 1006, the receiver 1008, or as a separate circuitry. In some embodiments, the scheduler controller operations 300 (FIG. 3) may also be implemented within the NB 1000, for example, within the transmitter 1006, the receiver 1008, or as a separate circuitry. Some of the algorithms, such as to implement the operations illustrated in FIGS. 3 and 5, may also be implemented as software executed using the NB processor 1004.

In an embodiment, the NB 1000 is configured to operate in a LTE network using an OFDMA downlink and uplink channels. In alternative embodiments, other systems, network types and transmission schemes can be used, for example, WiMax, 1XEV-DO, IEEE 802.11, IEEE 802.15 and IEEE 802.16. The NB 1000 may have multiple transmitters, receivers and antennas to support MIMO operation.

In one embodiment, the present invention teaches beam avoidance in independent cell scheduling by using a penalty function. In one embodiment, the penalty function depends on the max correlation between reported PMI of the other cell interference (OCI) and the PMI of the current UE. Alternatively, in another embodiment the penalty function depends on the channel co-variances of all the OCI/s. In another embodiment, the penalty function depends on the max correlation between the reported PMI/channel covariances of the OCI/s and the precoder designed for the current UE.

In yet another embodiment of the invention includes a cluster based scheduling based on iteration where the scheduling order of the NB's changes randomly or the order is driven by the most "influenced cell". Embodiments of the invention comprise simplification of the joint optimization problem by conditional iteration over all the cells in a desired cluster order.

In yet another embodiment of the invention includes a mode adaptation method for both single-cell MU-MIMO or Multi-cell and CBF based MU-MIMO. Simplified single-user/multi-user mode adaptation per-cell which compares already scheduled user (N−1) are described.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for wireless communication by a base station, comprising:
   selecting a user equipment for a sub-band that minimizes interference to scheduled user equipments already scheduled in the sub-band by one or more other base stations, the selecting comprising:
      calculating a primary priority function for each user equipment to be scheduled as a function of a penalty function and a signal to interference noise ratio, and
      selecting the user equipment with a highest primary priority function for the sub-band.

2. The method of claim 1, wherein the penalty function depends on a maximum correlation between a reported precoding matrix index (PMI) of all scheduled user equipments and a PMI of the selected user equipment.

3. The method of claim 1, wherein the penalty function depends on channel covariances of all the scheduled user equipments in other cells.

4. The method of claim 1, wherein the penalty function is calculated from a precoder correlation combined with a received interference power.

5. The method of claim 1, wherein the penalty function depends on a maximum correlation between a reported precoding matrix index (PMI) and channel covariances of all scheduled user equipments and a PMI of the selected user equipment.

6. The method of claim 1, wherein the penalty function is calculated in accordance with an interaction between a precoder and effective channels of the selected user equipment.

7. The method of claim 1 further comprising:
   scheduling a first plurality of user equipments comprising N−1 user equipments;
   calculating an incremental capacity for adding another user (UE(j)); and
   adding the another user when the incremental capacity is greater than a safety factor multiplied by a capacity of the N−1 user equipments.

8. The method of claim 7, wherein the another user is added when the following inequality is satisfied:

$$\sum_{j=0}^{N-1} CapVal(j) - N\log_2(N) > \left[\sum_{j=0}^{N-2} CapVal(j) - (N-1)\log_2(N-1)\right] * \alpha$$

wherein α is the safety factor, and wherein CapVal(j) is Shannon capacity of the UE (j).

9. The method of claim 1, further comprising:
   receiving a scheduling order;
   determining the one or more other base stations scheduled ahead of the base station; and
   identifying the already scheduled user equipments in accordance with the determining.

10. The method of claim 1, further comprising:
    scheduling a first user equipment;
    calculating an incremental capacity for adding a second user equipment; and
    switching to a multi-user multiple-input-multiple-output (MU-MIMO) when the incremental capacity over a capacity for a single user MIMO (SU-MIMO) of the first user equipment is greater than a threshold.

11. A base station comprising:
    a processor coupled to a network interface, the processor configured to select a user equipment for a sub-band that minimizes interference to scheduled user equipments already scheduled in the sub-band by one or more other base stations, the selecting comprising:
calculating a primary priority function for each user equipment to be scheduled as a function of a penalty function and a signal to interference noise ratio, and
selecting the user equipment with a highest primary priority function for the sub-band.

12. The base station of claim 11, wherein the penalty function depends on a maximum correlation between a reported precoding matrix index (PMI) of all scheduled user equipments and a PMI of the selected user equipment.

13. The base station of claim 11, wherein the penalty function depends on channel covariances of all the scheduled user equipments in other cells.

14. The base station of claim 11, wherein the penalty function is calculated from a precoder correlation combined with a received interference power.

15. The base station of claim 11, wherein the penalty function depends on a maximum correlation between a reported precoding matrix index (PMI) and channel covariances of all scheduled user equipments and a PMI of the selected user equipment.

16. The base station of claim 11, wherein the penalty function is calculated in accordance with an interaction between a precoder and effective channels of the selected user equipment.

17. The base station of claim 11, wherein the processor is further configured to:
schedule a first plurality of user equipments comprising N−1 user equipments;
calculate an incremental capacity for adding another user (UE(j)); and
add the another user when the incremental capacity is greater than a safety factor multiplied by a capacity of the N−1 user equipments.

18. The base station of claim 17, wherein the another user is added when the following inequality is satisfied:

$$\sum_{j=0}^{N-1} CapVal(j) - N\log_2(N) > \left[\sum_{j=0}^{N-2} CapVal(j) - (N-1)\log_2(N-1)\right] * \alpha$$

wherein $\alpha$ is the safety factor, and wherein CapVal(j) is Shannon capacity of the UE (j).

19. The base station of claim 11, wherein the processor is further configured to:
receive a scheduling order;
determine the one or more other base stations scheduled ahead of the base station; and
identify the already scheduled user equipments in accordance with the determining.

20. The base station of claim 11, wherein the processor is further configured to:
schedule a first user equipment;
calculate an incremental capacity for adding a second user equipment; and
switch to a multi-user multiple-input-multiple-output (MU-MIMO) when the incremental capacity over a capacity for a single user MIMO (SU-MIMO) of the first user equipment is greater than a threshold.

21. The base station of claim 11, wherein the processor is further configured to:
schedule a first plurality of user equipments;
calculate an incremental capacity for adding another user; and
add the another user when the incremental capacity is greater than a safety factor multiplied by a capacity of the first plurality of user equipments.

22. The method of claim 1 further comprising:
scheduling a first plurality of user equipments;
calculating an incremental capacity for adding another user; and
adding the another user when the incremental capacity is greater than a safety factor multiplied by a capacity of the first plurality of user equipments.

23. A method for wireless communication comprising:
selecting a user equipment for a sub-band that minimizes interference to already scheduled user equipments by,
calculating a primary priority function for each user equipment to be scheduled as a function of a penalty function and a signal to interference noise ratio, and
selecting the user equipment with a highest primary priority function for the sub-band;
scheduling a first plurality of user equipments comprising N−1 user equipments;
calculating an incremental capacity for adding another user (UE(i)); and
adding the another user when the incremental capacity is greater than a safety factor multiplied by a capacity of the N−1 user equipments.

24. A base station comprising:
a processor coupled to a network interface, the processor configured to select a user equipment for a sub-band that minimizes interference to already scheduled user equipments by,
calculating a primary priority function for each user equipment to be scheduled as a function of a penalty function and a signal to interference noise ratio, and
selecting the user equipment with a highest primary priority function for the sub-band,
wherein the processor is further configured to:
schedule a first user equipment;
calculate an incremental capacity for adding a second user equipment; and
switch to a multi-user multiple-input-multiple-output (MU-MIMO) when the incremental capacity over a capacity for a single user MIMO (SU-MIMO) of the first user equipment is greater than a threshold.

* * * * *

UNITED STATES PATENT AND TRADEMARK OFFICE
CERTIFICATE OF CORRECTION

PATENT NO.         : 8,923,844 B2                                Page 1 of 1
APPLICATION NO.    : 12/853067
DATED              : December 30, 2014
INVENTOR(S)        : Cornelius van Rensburg It is certified that error appears in the above-identified patent and that said Letters Patent is hereby corrected as shown below:

In the Claims

In Col. 16, line 32, claim 23, delete "(UE(i));" and insert --(UE(j));--.

Signed and Sealed this
Seventh Day of April, 2015

Michelle K. Lee
*Director of the United States Patent and Trademark Office*